(12) United States Patent
Reinprecht et al.

(10) Patent No.: US 10,119,670 B2
(45) Date of Patent: Nov. 6, 2018

(54) HEADLIGHT FOR VEHICLES

(71) Applicant: ZKW Group GmbH, Wieselburg (AT)

(72) Inventors: Markus Reinprecht, Hofstetten (AT); Michael Riesenhuber, Wieselburg (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 15/580,256

(22) PCT Filed: Jun. 6, 2016

(86) PCT No.: PCT/AT2016/050177
§ 371 (c)(1),
(2) Date: Jan. 5, 2018

(87) PCT Pub. No.: WO2016/197167
PCT Pub. Date: Dec. 15, 2016

(65) Prior Publication Data
US 2018/0142856 A1    May 24, 2018

(30) Foreign Application Priority Data
Jun. 9, 2015   (AT) .................................. 50470/2015

(51) Int. Cl.
*F21S 41/63*        (2018.01)
*G02B 26/08*        (2006.01)
(Continued)

(52) U.S. Cl.
CPC ............. *F21S 41/635* (2018.01); *F21S 41/16* (2018.01); *F21S 41/36* (2018.01); *F21S 41/663* (2018.01);
(Continued)

(58) Field of Classification Search
CPC .......... F21S 41/635; F21S 41/36; F21S 41/16; F21S 41/663; F21S 41/683; F21S 41/675; F21S 41/692; G02B 26/0833
See application file for complete search history.

(56) References Cited

U.S. PATENT DOCUMENTS 5,938,319 A    8/1999  Hege
9,157,597 B2  10/2015  Gürtl et al.
(Continued)

FOREIGN PATENT DOCUMENTS

DE        19737653 A1   3/1999
DE    102008036193 A1   2/2010
(Continued)

OTHER PUBLICATIONS

International Search Report for PCT/AT2016/050177, dated Sep. 16, 2016 (2 pages).
(Continued)

*Primary Examiner* — Thomas M Sember
(74) *Attorney, Agent, or Firm* — Eversheds Sutherland (US) LLP (57) ABSTRACT

A headlight for vehicles, said headlight comprising at least one light source (1) together with a focusing optical unit (6), a micromirror array (7), and an imaging optical unit (9), wherein a central computing unit (4) comprising a light source control (3) and an array control (12) is associated with the light source and with the micromirror array, and the central computing unit is configured to switch the position of the micromirrors between an OFF state and an ON state periodically with a predefined control frequency and a predefined duty cycle by means of the array control, and the formed light ray (2) from the at least one light source is directed at the micromirror array, and the light beam structured and reflected thereby is projected onto the road (11) as a light pattern (10) via the imaging optical unit (9), wherein
(Continued)

the computing unit (4) is configured to suppress the focused light ray (2) directed at the micromirror array (7) at predefinable times and synchronously with the control frequency of the micromirror array by means of the light source control (3) and/or the array control (12).

8 Claims, 6 Drawing Sheets

(51) Int. Cl.
<table>
<tr><td>F21S 41/36</td><td>(2018.01)</td></tr>
<tr><td>F21S 41/663</td><td>(2018.01)</td></tr>
<tr><td>F21S 41/675</td><td>(2018.01)</td></tr>
<tr><td>F21S 41/692</td><td>(2018.01)</td></tr>
<tr><td>F21S 41/16</td><td>(2018.01)</td></tr>
<tr><td>F21S 41/683</td><td>(2018.01)</td></tr>
<tr><td>F21S 41/14</td><td>(2018.01)</td></tr>
<tr><td>F21S 41/141</td><td>(2018.01)</td></tr>
<tr><td>F21S 41/365</td><td>(2018.01)</td></tr>
<tr><td>B60Q 1/14</td><td>(2006.01)</td></tr>
</table>

(52) U.S. Cl.
CPC ........... *F21S 41/675* (2018.01); *F21S 41/683* (2018.01); *F21S 41/692* (2018.01); *G02B 26/0833* (2013.01); *B60Q 1/14* (2013.01); *F21S 41/14* (2018.01); *F21S 41/141* (2018.01); *F21S 41/365* (2018.01)

(56) References Cited

U.S. PATENT DOCUMENTS

| | | |
|---|---|---|
| 2016/0152173 A1 | 6/2016 | Mayer |
| 2016/0195231 A1 | 7/2016 | Grötsch |

FOREIGN PATENT DOCUMENTS

| | | |
|---|---|---|
| DE | 102010048659 A1 | 4/2012 |
| DE | 102014213179 A1 | 1/2015 |
| EP | 1433655 A2 | 6/2004 |

OTHER PUBLICATIONS

Search Report issued in Austrian Application No. A 50470/2015, completed Apr. 12, 2016 (1 page).

| 0 | 0 | 0 | 0 | 0 | 0 | 0 | 75 | 0 | 0 | 0 | 0 | 0 | 0 | 0 |
|---|---|---|---|---|---|---|---|---|---|---|---|---|---|---|
| 0 | 0 | 0 | 0 | 0 | 0 | 75 | 100 | 75 | 0 | 0 | 0 | 0 | 0 | 0 |
| 0 | 0 | 0 | 25 | 25 | 75 | 100 | 100 | 100 | 75 | 25 | 25 | 0 | 0 | 0 |
| 0 | 25 | 25 | 25 | 50 | 75 | 75 | 75 | 75 | 75 | 50 | 25 | 25 | 25 | 0 |
| 0 | 0 | 25 | 25 | 50 | 50 | 50 | 50 | 50 | 50 | 50 | 25 | 25 | 0 | 0 |

HEADLIGHT FOR VEHICLES

The invention relates to a headlight for vehicles, comprising at least one light source together with a focusing optical unit, a micromirror array, and an imaging optical unit, wherein a central computing unit comprising a light source control and an array control is associated with the light source and with the micromirror array, the formed light ray from the at least one light source is directed at the micromirror array, and the light beam structured and reflected thereby is projected onto the road as a light pattern via the imaging optical unit, and, in the event of a masking scenario in a region of the micromirror array, the computing unit is configured to switch over the micromirrors of the micromirror array temporarily by means of the light source control and/or the array control in order to generate a masked region of the light pattern.

In the development of current headlight systems, increasing focus is being placed on the desire to be able to project a light pattern of maximum resolution onto the carriageway, which light pattern can be quickly changed and adjusted to the particular traffic, road, and light conditions. The term "carriageway" is used here by way of simplification, because it is of course dependent on the local conditions as to whether the light pattern is actually disposed on the carriageway or also extends therebeyond. In principle, the light pattern in the sense used here corresponds to a projection onto a vertical surface in accordance with the relevant standards relating to motor vehicle lighting technology.

In accordance with the aforementioned requirement, different headlight systems have been developed, with the following being cited by way of representation.

Systems which project the light of a large number of LEDs as a light pattern onto the carriageway via projection systems having individual lenses, wherein the brightness of the individual LEDs can be controlled, individually set or changed from a central computing unit. For example, see the Pixel-lite™ headlight systems offered by the applicant, described inter alia in AT 513.738 B1.

Other headlight systems work with scanning, modulated laser beams, wherein, from a lighting perspective, the starting point is at least one laser light source which emits a laser beam and which is associated with a laser control, which is used for power supply and also to monitor the laser emission or for example for temperature control and is also configured to modulate the intensity of the emitted laser beam. Here, the term "modulate" is to be understood to mean that the intensity of the laser light source can be changed, whether continuously or pulsed in the sense of a switching on and off. What is essential is that the light output can be dynamically changed analogously depending on the angular position at which a mirror deflecting the laser beam is arranged. It is additionally possible to switch the light source on and off for a certain time so as not to illuminate or mask defined points. An example of a dynamic control concept for generating a pattern by a scanning laser beam is described for example in document AT 514633 in the name of the applicant.

The aforesaid headlight systems are very complex and costly in part, and it is thus desirable to create economical headlights which nevertheless have a high flexibility in respect of the generated light pattern. In this sense, it has been known to use imagers which have a large number of controllable pixel fields as light processing elements. Document DE 10 2013 215 374 A1 presents solutions in which the light from a light source is deflected via what is known as a "taper" (a conical light-guiding element) to an LCD imager, to an LCoS chip, or to a micromirror array ("DMD") so as to then be projected onto the carriageway via a projection optical unit.

DMD is an acronym used for "Digital Micromirror Device", and thus for a micromirror array or micromirror matrix. A micromirror array of this kind has very small dimensions, typically in the order of 10 mm. In the case of a DMD, micromirror actuators are arranged in a matrix-like manner, wherein each individual mirror element can be tilted about a certain angle, for example 20°, for example by electromagnetic or piezoelectric actuators. The end positions of a micromirror are referred to in this description as the ON state or OFF state, wherein ON state means that light passes from the micromirror onto the road via the imaging optical unit, whereas in the OFF state it is directed for example at an absorber. A headlight based on a micromirror array is described for example in DE 195 30 008 A1.

The invention is based on a headlight of the type cited above, which thus uses a DMD.

One problem that occurs with DMDs in conjunction with pulsed lasers with a high peak output, however, is the heating of the individual micromirrors or mirror plates, since DMDs are usually specified up to approximately 85° C. and the surface of the mirror plates which represent the individual pixels should generally be kept below a critical temperature of 150° C. Higher temperatures generally lead to a reduction of the service life, in particular also on account of the memory effect of the resilient mirror mountings, which at higher temperatures occurs more quickly than at low temperatures. The applied duty cycle, specifically the duty ratio between an ON state and an OFF state of the individual micromirrors, of course plays a role equally. In order to explain this, it is stated by way of example for a selected DMD type that with a duty cycle of 80% (100%) and a temperature of the DMD of 55° C., the service life is more than 8000 h (6200 h), and at 70° C. is only 2600 h (1500 h), and at 90° C. is 450 h (270 h), with the values between parentheses relating to a duty cycle of 100%.

With the selected DMD the service life at 50° C. and a duty cycle of 100% is >8000 hours, and therefore in this operating state the mirror could always remain in the position desired by the user without having to sustain any service life restrictions. By contrast, the service life at 90° C. and 100% duty cycle is only 270 hours, which is no longer acceptable for practical applications. In order to achieve a service life of 8000 hours in the second-mentioned operating state (90° C. and 100%), the duty cycle must be reduced to 50%. This means that each micromirror must be arranged in a position +10° for 50% of the time, and in a position −10° for 50% so as to achieve the service life (here, a pivoting of the mirror between the end positions through a total of 20° has been assumed).

This means, applied to a figurative headlight, that 50% of the generated light at high temperatures has to be deflected to an absorber and cannot reach the road, which understandably significantly reduces the efficiency of the overall system.

A further considerable problem in the case of a figurative headlight lies in masking scenarios, i.e. situations in which for example an oncoming vehicle is to be masked out, since those regions which should be dark are still struck with 50% of the maximum illuminance. This 50% would also lead to a significant dazzling of the oncoming traffic. Starting for example from a maximum illumination generated by the headlight system of 100 lx, the masked traffic would be illuminated with 50 lx, yet the normal legal limit for a masking scenario is 1 lx. The oncoming traffic therefore would not be considered to be masked, and the system would not conform to legal requirements.

The object of the invention is to create a headlight in which the aforesaid disadvantages are avoided or at least heavily reduced, wherein in particular a masking scenario is to be made possible, even with a duty cycle for example of 50%.

This object is achieved with a headlight of the type described in the introduction, in which, in accordance with the invention, the central computing unit is configured to switch the position of the micromirrors between an OFF state and ON state periodically with a predefined control frequency and a predefined duty cycle by means of the array control, and the formed light ray of the at least one light source is directed at the micromirror array, and the light beam structured and reflected thereby is projected onto the road as a light pattern via the imaging optical unit, wherein the computing unit is configured to suppress the focused light ray directed at the micromirror array at predefinable times and synchronously with the control frequency of the micromirror array by means of the light source control and/or the array control.

The solution according to the invention offers the advantage that particular operating states can be controlled without having to change the duty cycle of the micromirror array. The thermal load of the DMD chip can thus be kept within limits, which is advantageous for the service life thereof.

In an embodiment that is particularly expedient for masking scenarios, it is provided that the computing unit, in order to generate a masked region of the light pattern by means of the light source control and/or the array control in the event of a masking scenario in a region of the micromirror array, is configured to shift the micromirrors in their periodic switching phase by 180° from the OFF state to the ON state and to suppress the focused light ray directed at the micromirror array at those times at which the micromirrors have been shifted to the ON state and synchronously with the control frequency of the micromirror array.

In the sense of a design of the control that is not excessively complex, it can be expedient if the computing unit is configured to suppress the light ray directed at the array synchronously with the control frequency of the micromirrors during the OFF phases by means of the light source control and/or the array control.

In accordance with another very advantageous development of the invention it is provided that the computing unit, in order to selectively illuminate a region of the carriageway/the light pattern, is configured, during the ON state of all micromirrors responsible for all regions outside the region that is to be selectively illuminated, to suppress the light ray directed at the array synchronously with the control frequency of the micromirrors during the OFF states by means of the light source control and/or the array control.

In a further variant it is provided that, in order to generate a structured light pattern with different illuminances, the computing unit (4) is configured to phase-shift the ON states of micromirrors by certain times t1 . . . t4 and to suppress the light ray directed at the array synchronously with the control frequency of the micromirrors of the OFF states by means of the light source control (3) and/or the array control (12), wherein, depending on the phase shift, at least one temporal region of the ON states falls within the suppression period. In this way, a light pattern can be produced that is structured in accordance with certain specifications, wherein here as well the focus is on avoiding excessively high heating that reduces the service life of a micromirror array.

A practical embodiment provides that a pivotable mirror is provided in the beam path between the light source and the micromirror array, which mirror has a drive, which, depending on activation by a signal delivered from the computing unit and synchronised with the switchover behaviour of the micromirror array, can be moved so that it steers the light ray of the light source towards the micromirror array or away therefrom, preferably to an absorber, depending on the activation.

In accordance with another expedient variant, it can be provided that a movable diaphragm movable by a drive is arranged in the beam path between light source and micromirror array, which diaphragm releases or blocks the beam path to the micromirror array depending on activation by a signal of the computing unit synchronised with the switchover behaviour of the micromirror array.

In accordance with yet another tried and tested variant, the movable diaphragm is formed as a rotating diaphragm, which is driven by a motor controlled by a signal delivered from the computing unit and synchronised with the switchover behaviour of the micromirror array.

Instead of the suppression, which in principle is mechanical, it can also additionally be provided, as appropriate, that a switching of the light source ON/OFF controlled by the computing unit and synchronised with the switchover behaviour of the micromirror array is provided for the temporary and synchronised suppression of the light ray directed at the micromirror array. Due to the periodic switching off of the light source, the heat losses or an undesirable heating understandably can be significantly reduced.

The invention and further advantages will be explained in greater detail hereinafter on the basis of exemplary embodiments illustrated in the drawing, in which.

Figure 1:
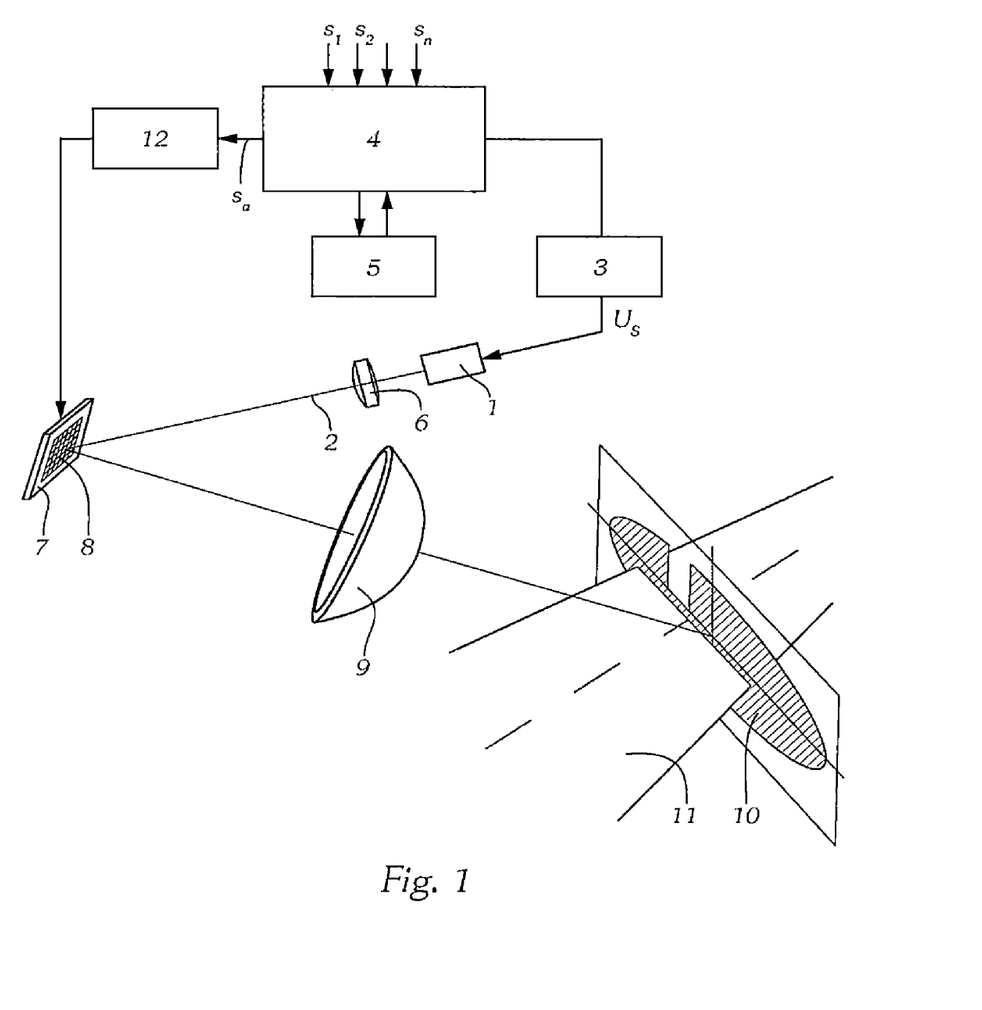
FIG. 1 shows the components essential to the invention of a headlight with a micromirror array, corresponding fundamentally to the prior art.

With reference to FIG. 1 an exemplary embodiment of the invention will now be explained in greater detail. In particular, the parts important for a headlight according to the invention are depicted, wherein it is clear that a motor vehicle headlight also contains many other parts which enable expedient use of said headlight in a motor vehicle, in particular a passenger car or motorbike. From a lighting perspective, the starting point of the headlight is a light source 1, which emits a light ray 2, and which is associated with a control 3, wherein this control 3 is used to supply power to the light source 1 and to monitor said light source or for example for temperature control and can also be configured to modulate the intensity of the emitted light ray. In conjunction with the present invention, the term "modulate" is understood to mean that the intensity of the light source can be changed, whether continuously or in a pulsed manner, in the sense of a switching on and off. Here, it is additionally possible to switch the light source on and off for a certain time. Here, LED light sources which can be operated with high currents—what are known as "High Power LEDs"—are preferably used so as to achieve a maximum luminous flux and thus a maximum luminance on a DMD chip. The control signal of the light source 1 is denoted by $U_S$.

The control 3 for its part receives signals from the central computing unit 4, to which sensor signals s1 ... si ... sn can be fed. These signals for example on the one hand can be switch commands for switching over from main beam to dipped beam or on the other hand can be signals which for example are recorded by sensors, such as cameras, which detect the lighting conditions, ambient conditions and/or objects on the carriageway. The signals can also originate from vehicle-vehicle communication information. The computing unit 4 shown here schematically as a block can be contained completely or partially in the headlight, wherein the computing unit 4 is also associated with a memory unit 5.

The light source 1 can be arranged upstream of an optical unit 6, the design of which is dependent, amongst other things, on the type, number and physical placement of the used lighting means, such as laser diodes or LEDs, and on the necessary beam quality, and which in particular is intended to ensure that the light emitted by the light source impinges on the micromirrors of a micromirror array 7 homogeneously or in a desired intensity distribution deviating therefrom.

The focused or formed light ray 2 now passes to this micromirror array 7, on which a lighting pattern 8 is formed by appropriate positioning of the individual micromirrors, which lighting pattern can be projected in the form of a light pattern 10 onto a road 11 via an imaging optical unit 9. The computing unit 4 delivers signals $s_a$ to an array control 12, which controls the individual micromirrors of the array 7 in a manner corresponding to the desired light pattern. The individual micromirrors of the array 7 can be individually controlled in respect of the frequency, phase, and deflection angle.

Figure 2:
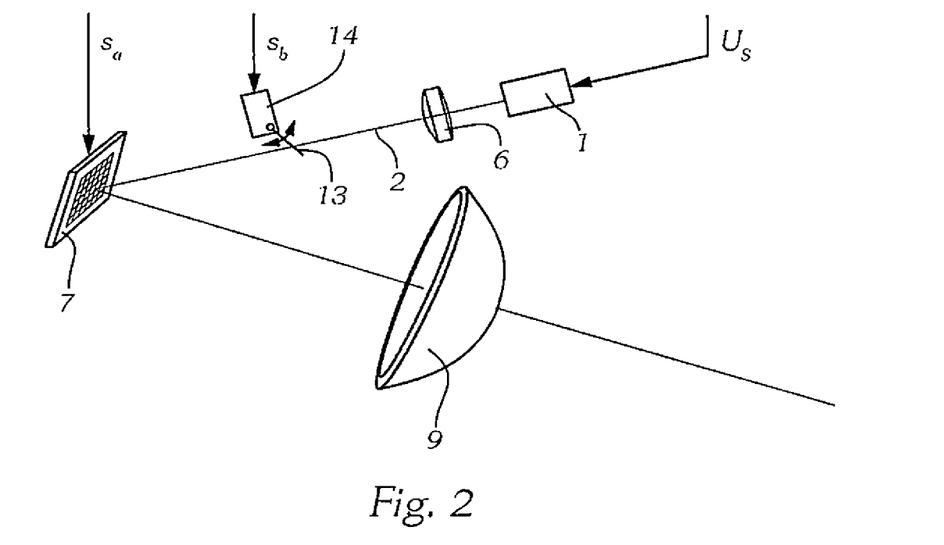
FIG. 2 shows a first embodiment of the invention in a depiction corresponding to FIG. 1 with emphasis of the components that are important for the function according to the invention.

FIG. 2 shows a first embodiment of the invention, wherein like reference signs have been used for like parts and only part of the control has been depicted, although this corresponds in principle to the control according to FIG. 1. Here, a tiltable or movable diaphragm 13 is arranged between the light source 1 and the array 7, which diaphragm can be moved by a suitable drive 14, for example an electromagnetic drive, so that it releases or blocks the beam path to the micromirror array 7 depending on activation by a signal $s_b$ delivered from the computing unit. This switchover is synchronised with the switchover behaviour of the micromirror array 7, which will be explained further below.

Figure 3:
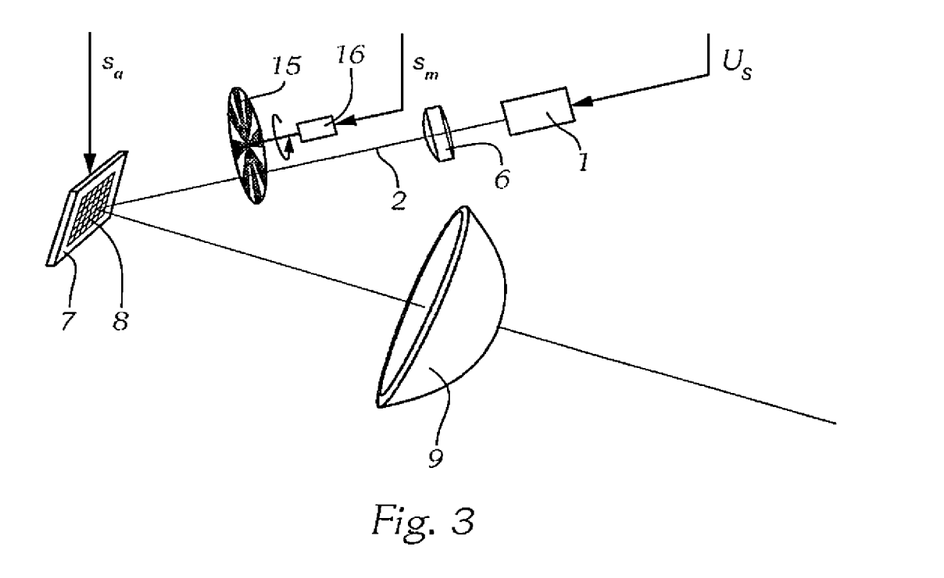
FIG. 3 shows a second embodiment of the invention in a depiction corresponding to FIG. 2.

FIG. 3 shows another embodiment, the function of which however is similar to that according to FIG. 2 and leads to the same desired result. Instead of the tiltable diaphragm of FIG. 2, a rotating diaphragm 15 is arranged here in the beam path to the micromirror array 7 and is driven by a motor 16. This motor 16 is supplied with a signal $s_m$ delivered from the computing unit, which signal ensures that the motor runs synchronously with the switchover behaviour of the micromirror array 7. The rotating diaphragm can contain a number of fields, which are permeable to light or block light.

Figure 4:
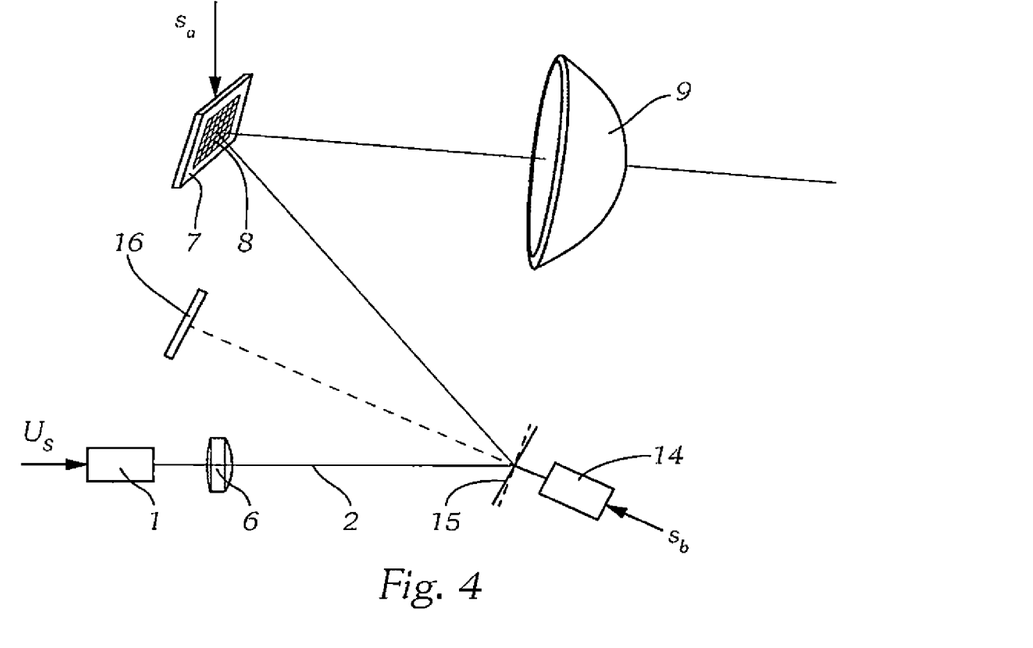
FIG. 4 shows a third embodiment of the invention in a depiction corresponding to FIG. 2.

A further variant is shown in FIG. 4, which has a pivotable mirror 15, which similarly to the diaphragm of FIG. 2 has a drive 14 which can be moved so that, depending on activation by a signal $s_b$ delivered from the computing unit, it steers the light ray 2 from the light source 1 to the micromirror array 7 or to an absorber 16, which absorbs the light held away from the array 7 and thus also prevents undesirable reflections in the headlight.

Figure 5:
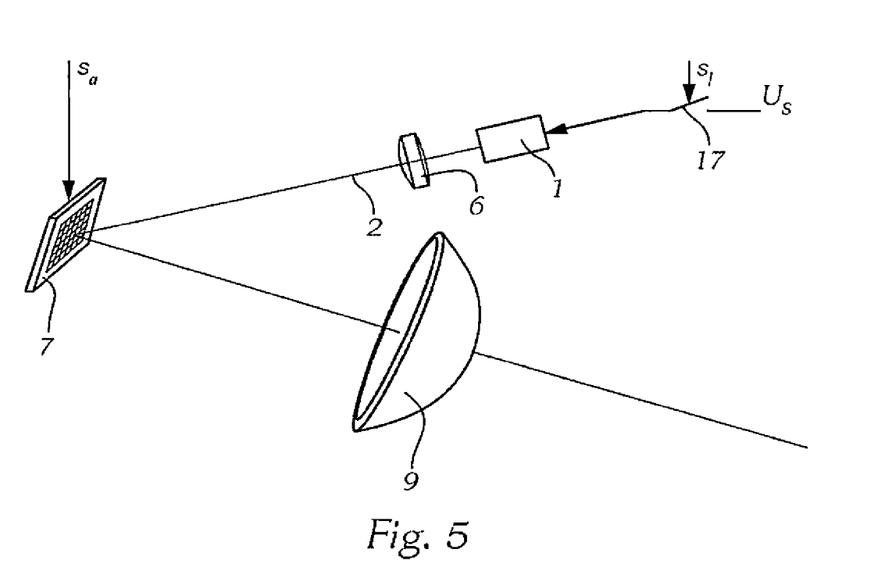
FIG. 5 shows a fourth embodiment of the invention in a depiction corresponding to FIG. 2.

Lastly, in the variant according to FIG. 5 it is shown that the temporary and synchronised suppression of the light ray 2 directed at the micromirror array 7 can also be implemented by a controlled switch 17, which is controlled by a signal $s_t$, which, similarly to the aforementioned signals $s_b$ and $s_m$, originates from the central computing unit 4 and is synchronised with the signals $s_a$ for the array control 12 in the manner explained in detail further below.

Before the function of the invention is described hereinafter on the basis of a number of examples, it should be noted that here terms such as OFF phase, OFF state or light OFF in conjunction with the position of a micromirror disposed on the micromirror array are intended to mean that the corresponding micromirror is in a position in which the corresponding region/pixel is masked in the light pattern or at least provides an illuminance of less than 1 lx in this region/pixel. Terms such as ON phase, etc. are to be understood in the opposite sense.

The suppression of the light ray in a headlight according to the invention will be presented hereinafter in a first example with reference to FIG. 6.

Should part of the light image which is uniformly illuminated be formed on the road via the DMD chip, it is recommended to move the micromirrors of the micromirror array simultaneously from a first position to a second in order to provide a desired duty cycle.

The duty cycle (the duty ratio) does not have to be 50:50, thus 50%, but can also be higher depending on the maximum anticipated temperature. If cooling can be provided which cools the chip to a temperature below 60° C., the duty cycle can be increased for example even to 70/30, thus 70%. In order to avoid a high control-related cost, the duty cycle is preferably set to a fixed value from the start, usually from the factory.

Part of the light pattern is preferably formed via a DMD chip in the middle of a main beam pattern, since a high resolution is desirable in this region.

Figure 6:
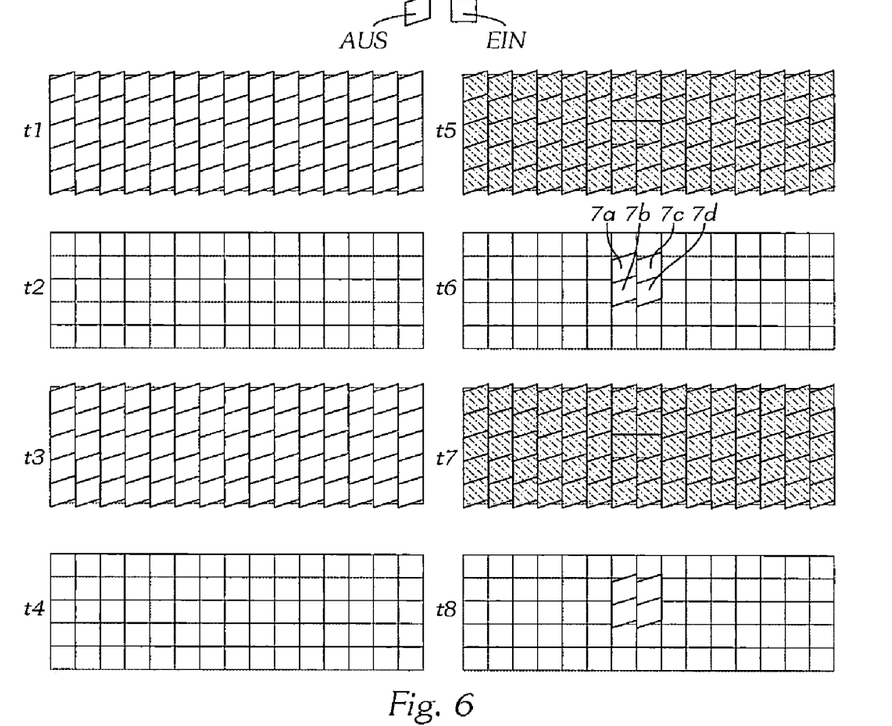
FIG. 6 shows the position of the micromirrors of a heavily simplified micromirror array at eight individual points in time, FIG. 7 in a time graph shows the phase-shifted switchover of micromirrors.

Referring now in greater detail to FIG. 6, this shows schematically an array reduced for improved readability to 5*15=75 individual mirrors at eight points in time t1 to t8 of operation. During normal operation, at the times t1 to t4, as already described above, all micromirrors are moved simultaneously from the first position to the second, more specifically with a duty ratio adjusted to the temperature or cooling. At the times t1 and t3, all individual mirrors are in the position OFF, and at the times t2 and t4 are in the position ON.

The hatched area shows the time portions t5, t7, at which the light ray directed at the micromirror array is suppressed in accordance with the invention.

During the above-mentioned normal operation, it is not necessary to suppress the light ray directed at the micromirror array. However, it can also be advantageous during the OFF phases to suppress the light ray directed at the array synchronously with the control frequency of the micromirrors of the micromirror array, since a temperature rise at the DMD chip on account of reflection-induced losses can thus be avoided. The term "control frequency" is to be understood to mean the frequency at which the micromirrors of the micromirror array change periodically from the OFF state to the ON state.

Figure 7:
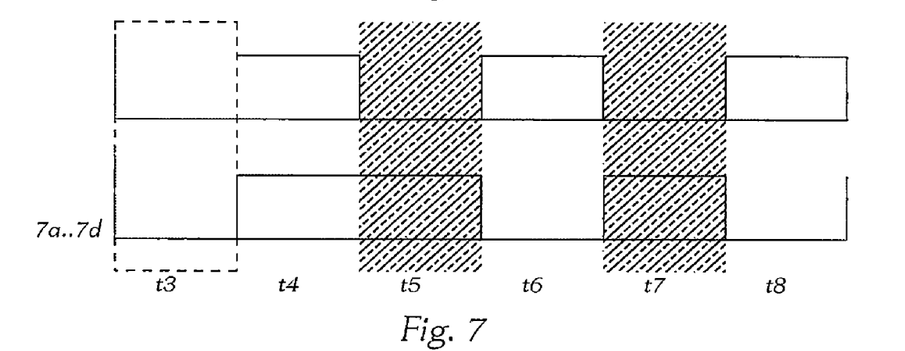

Reference will now be made additionally to FIG. 7: If a masking scenario is to be provided, concerning a certain region in the light pattern, for example an oncoming vehicle, wherein at the same time the duty cycle is to be fundamentally retained, those micromirrors, denoted in FIG. 6 at the time t5 by 7a to 7d, responsible for the corresponding region/pixel in the light pattern are now shifted in their periodic switching phase through 180° from the OFF state to the ON state (see time t5). This phase shift can be seen in FIG. 7, in the lower line of which the operation during the masking scenario with the aforementioned phase shift is depicted.

The micromirrors of the micromirror array by means of which the region to be masked is to be formed, i.e. in the illustrated example the micromirrors 7a to 7d, thus remain in their OFF state, and the rest of the micromirrors of the micromirror array switch to the ON state.

Within the sense of the present invention, the light ray directed at the micromirror array is now additionally suppressed in this time phase, in which the positions of the micromirrors 7a to 7d of the micromirror array are shifted in their periodic switching phase through 180°. A certain duty cycle can thus be retained, although a region in the light pattern is to be masked.

The time for which the light ray directed at the micromirror array is to be suppressed thus corresponds to the time for which the micromirrors of the micromirror array "responsible" for the region to be masked remain in a position, for example the time for which a micromirror remains in the ON state. This period of time is naturally related to the applied duty cycle. This amounts to a suppression of the light ray synchronously with the control frequency of the micromirrors of the micromirror array.

In the use of a headlight for vehicles, the objects to be masked are normally moving, whereby a number of micromirrors of the micromirror array have to be displaced in their switching phase, as described above, through 180° during the course of the masking scenario.

As soon as the masking scenario has passed, normal operation is resumed again, which means that all micromirrors of the micromirror array switch in phase from the first position to the second.

A headlight according to the invention, as described above, can also be used to illuminate an object selectively, wherein a suppression is not applied in the ON state of the micromirrors "responsible" for the object to be illuminated—wherein this can also be just a single micromirror—but instead, in the ON state, is applied for the micromirrors of the micromirror array "responsible" for the regions/pixels outside the object to be illuminated. This approach, however, should be clear to a person skilled in the art.

In the previous example, it was shown how a duty cycle and yet a masking scenario are provided in a uniformly illuminated region. However, it is not usually desirable to illuminate the carriageway uniformly with a light pattern, but instead to generate a light image characteristic for vehicle headlights in accordance with fixed rules.

Accordingly, a particularly preferred application of a suppression according to the invention of the light ray will be presented in the next example:

In the following example, a heavily simplified auxiliary main beam pattern forms the basis in this sense with reference to FIG. 8, wherein this simplification is necessary in order to make the advantageous use of the invention as clear as possible. Micromirror arrays used in practice consist of several thousands of micromirrors, whereby a rough gradation, as shown in FIG. 8, does not actually correspond to the situation in practice.

Figure 8:
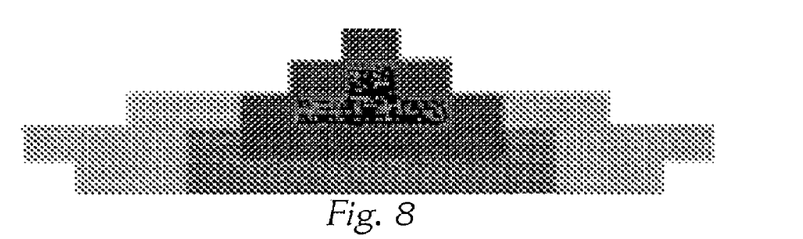
FIG. 8 shows a heavily simplified light pattern of a possible main beam distribution.
Figure 9:
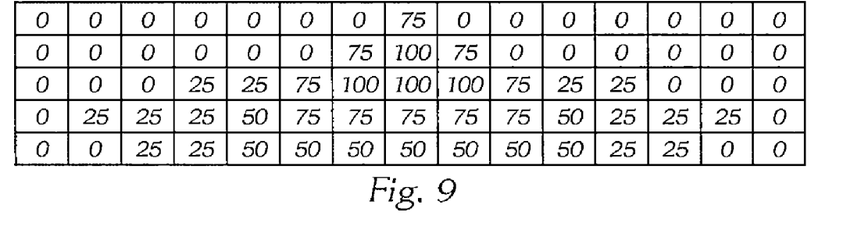
FIG. 9 shows a table with numerical values relating to the light pattern according to FIG. 8, FIG. 10 in five graphs shows switching states of the micromirrors of the array for the illuminances specified in FIGS. 8 and 9, FIG. 11 in a depiction similar to FIG. 6 shows the position of the micromirrors in order to achieve the light pattern shown in FIG. 8 and FIG. 9, and FIG. 12 in a graph shows the pulse-width-modulated control of micromirrors of the array.

In the light pattern of FIG. 8, only 5 different illuminances are illustrated by different point densities for simplified presentation, wherein these illuminances are specified in percent in FIG. 9, which is based on FIG. 8.

Here, 100% corresponds to the maximum possible illuminance. If, with a predefined duty cycle of 50/50, only 50% of the installed light output can be used, these correspond to 100% in this example. 0% corresponds to a region/pixel that is not illuminated.

As described above, the duty cycle does not have to be 50/50, but can also be set higher depending on the DMD chip temperature to be anticipated. wherein the more light that can be used, the greater is the duty cycle. For example, a duty cycle of 70/30 would signify a theoretical use of 70% of the installed light output.

Figure 10:
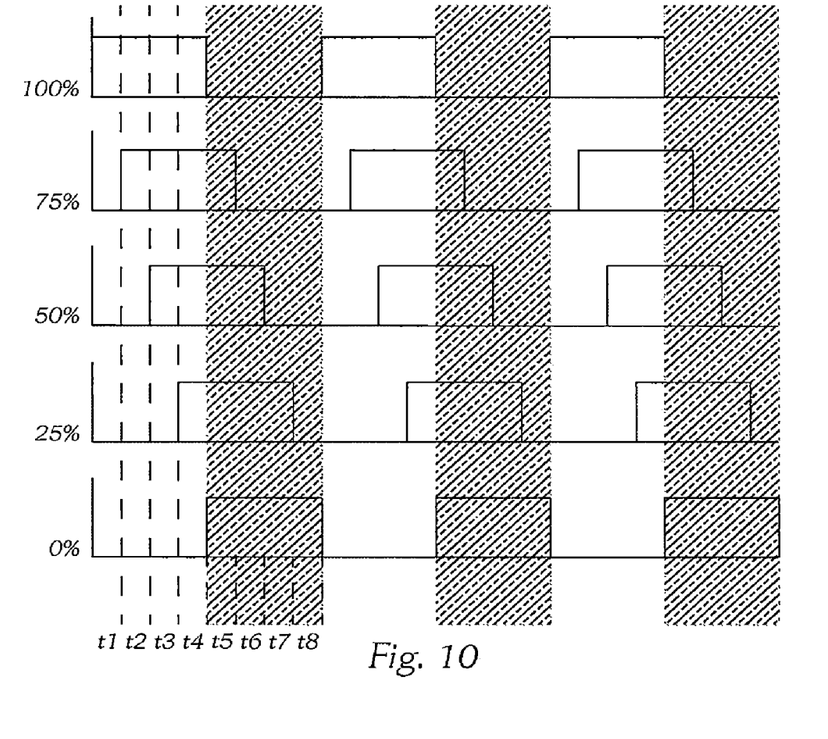

In FIG. 10 five graphs are shown, wherein the switching states of the micromirrors of the micromirror array responsible for the illuminances specified in FIG. 8 and FIGS. 9 of 0%, 25%, 50%, 75% and 100% are shown, respectively. The hatched area shows the time portions in which a suppression according to the invention of the light ray directed at the micromirror array is to be provided.

Figure 11:
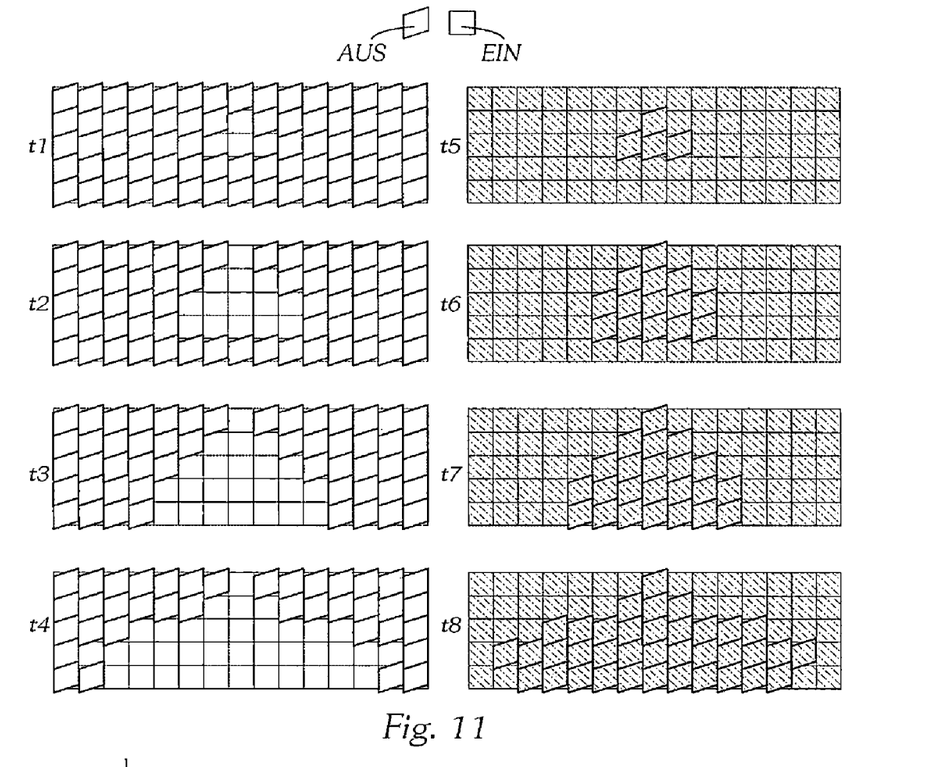

For further illustration, reference is made to FIG. 11, in which the time portions t1, t2, . . . t8 relate to the graphs of FIG. 10 (wherein it should be noted that these time portions have nothing to do with those of FIG. 7 and the associated example). In FIG. 11 it is thus shown how the micromirror array behaves during normal operation so as to achieve the top light pattern, shown in FIG. 8 and FIG. 9, with the different illuminances and a duty cycle of 50/50.

The position of the micromirrors at the time at which a suppression according to the invention of the light ray directed at the micromirror array takes place is shown on the right in FIG. 11 at the times t5 to t8.

It can be clearly seen that a non-uniform (or structured) light pattern is thus advantageously also generated and at the same time a certain duty cycle for the individual micromirrors of the micromirror array can also be provided.

The region that is to be acted on by 100% of the possible illuminance in the light image is in the ON state for the longest in the time from t1 to t4 over the middle micromirrors of the micromirror array. The term "middle micromirrors" means those micromirrors of the micromirror array that are in the ON state at the time t1 or that are "responsible" for the forming of the 100% regions of the light pattern (for example see FIG. 9).

By contrast, the micromirrors "responsible" for the 75% region in the light pattern, as can be seen in the graph and in the associated drawings, are in the ON state for ¾ (75%) of the time, specifically at the time portions t2 to t4. ¼ (25%) falls within the time period in which the light ray directed at the micromirror array is suppressed.

Those regions that are not to be illuminated in the light pattern, i.e. that correspond to 0%, are formed via the "responsible" micromirrors of the micromirror array such that, in the time in which the micromirrors of the micromirror array are acted on by the light ray, they are in the OFF state and—as soon as the necessary change caused by the duty cycle takes place—switch into the ON state. In this time the light ray is suppressed and there is no illumination in the light pattern, thus resulting in the desired light distribution.

As described in the previous example, in a masking scenario the micromirrors of the micromirror array that are "responsible" for the regions/pixels to be masked are shifted in their switching phase.

The phase shift is then dependent on the illuminance desired in normal operation. For example, those micromirrors of the micromirror array responsible for the 75% regions have to be shifted in their phase through 135° in order to shift their ON state into the light-suppressed phase. The micromirrors responsible for 50% regions have to be shifted through 90°, and those responsible for 25% regions have to be shifted through 45°, and those responsible for 100% regions, as already described in the previous example, have to be shifted by 180°.

The micromirrors of a micromirror array change their state from ON to OFF and vice versa several thousands of times per second. The micromirrors are preferably controlled with high frequencies so as to make light-suppressed phases and phase shifts of individual micromirrors as comfortable as possible for the driver, i.e. imperceptible. Control of the micromirrors with 200 Hz for example is customary, yet higher frequencies can be more advantageous, for example preferably 500 Hz, particularly preferably 1 kHz. However, in particular if the suppression is provided via a switching off/on of the light source, the switching times are much shorter, and therefore higher demands are placed on the control electronics.

It is also possible to dim the light source so that the entire light pattern is dimmed and dimmed up, which can be desirable particularly with switchover phases from one light function to another.

Figure 12:
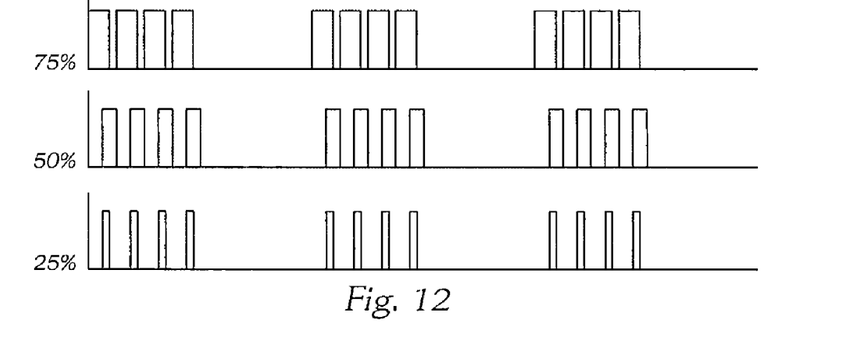

A further possibility to dim individually determined regions is that of controlling the ON phases of the individual micromirrors of the micromirror array by means of pulse width modulation, which is shown in FIG. 12 for a dimming to 75%, 50% and 25%. Here, the same phase shift at each micromirror of the micromirror array is advantageous in a masking scenario so as to arrive in the time region in which a suppression of the light ray directed at the micromirror array takes place. This can reduce control-related costs in masking scenarios, for example compared to the design according to FIG. 10, in which different phase shifts have to be implemented, whereas in the embodiment according to FIG. 12 the same phase shift of 180° is sufficient for each micromirror in a masking scenario.

The invention claimed is:

1. A headlight for vehicles, comprising:
   at least one light source (1);
   a focusing optical unit (6);
   a micromirror array (7) which comprises micromirrors;
   an imaging optical unit (9); and
   a central computing unit (4) comprising a light source control (3) and an array control (12) which are operably associated with the at least one light source and with the micromirror array, wherein the central computing unit is configured to switch a position of the micromirrors between an OFF state and an ON state periodically with a predefined control frequency and a predefined duty cycle by the array control,
   wherein the at least one light source is configured to form a light ray (2) which is directed at the micromirror array, such that a light beam structured and reflected thereby is projected onto a road (11) as a light pattern (10) via the imaging optical unit (9), and
   wherein the computing unit (4) is configured:
   to suppress the light ray (2) directed at the micromirror array (7) at predefinable times and synchronously with the predefined control frequency of the micromirror array by the light source control (3) and the array control (12),
   in order to generate a masked region of the light pattern in a masking scenario in a region of the micromirror array, to shift the micromirrors in their periodic switching phase by 180° from the OFF state to the ON state, and
   to suppress the focused light ray (2) directed at the micromirror array (7) at those times at which the micromirrors have been shifted to the ON state and synchronously with the predefined control frequency of the micromirror array.

2. The headlight according to claim 1, wherein the computing unit (4) is configured to suppress the light ray (2) directed at the micromirror array synchronously with the predefined control frequency of the micromirrors during the OFF state by the light source control (3) and/or the array control (12).

3. The headlight according to claim 1, wherein the computing unit (4), in order to selectively illuminate a region of a carriageway/the light pattern, is configured, during the ON state of all micromirrors responsible for all regions outside a region that is to be selectively illuminated, to suppress the light ray directed at the micromirror array synchronously with the predefined control frequency of the micromirrors during the OFF states by the light source control (3) and/or the array control (12).

4. The headlight according to claim 1, wherein, in order to generate a structured light pattern with different illuminances, the computing unit (4) is configured to phase-shift the ON states of micromirrors by certain times t1 . . . t4 and to suppress the light ray directed at the micromirror array synchronously with the control frequency of the micromirrors of the OFF states by the light source control (3) and/or the array control (12), wherein, depending on a phase shift, at least one temporal region of the ON states falls within a suppression period.

5. The headlight according to claim 1, wherein a pivotable mirror (15) is provided in a beam path between the light source (1) and the micromirror array (7), which pivotable mirror has a drive (14), which, depending on activation by a signal ($s_b$) delivered from the computing unit (4) and synchronised with a switchover behaviour of the micromirror array, is configured to be moved so that it steers the light ray (2) of the light source (1) towards the micromirror array or away therefrom to an absorber (16), depending on the activation by the signal.

6. The headlight according to claim 1, wherein a movable diaphragm (13) movable by a drive (14) is arranged in a beam path between the light source (1) and the micromirror array (7), which moveable diaphragm releases or blocks the beam path to the micromirror array depending on activation by a signal ($s_b$) of the computing (4) unit synchronised with a switchover behaviour of the micromirror array (7).

7. The headlight according to claim 6, wherein the movable diaphragm is formed as a rotating diaphragm (15), which is driven by a motor (16) controlled by a signal ($s_m$) delivered from the computing unit (4) and synchronised with the switchover behaviour of the micromirror array (7).

8. The headlight according to claim 1, wherein a switching of the light source (1) ON/OFF controlled by the computing unit (4) and synchronised with a switchover behaviour of the micromirror array is provided for a temporary and synchronised suppression of the light ray (2) directed at the micromirror array (7).

* * * * *